United States Patent [19]

Tsuno et al.

[11] Patent Number: 5,543,130
[45] Date of Patent: Aug. 6, 1996

[54] METAL CERAMIC COMPOSITE STRUCTURE

[75] Inventors: Nobuo Tsuno, Kasugai; Tomoyuki Fujii, Nagoya, both of Japan

[73] Assignee: NGK Insulators, Ltd., Japan

[21] Appl. No.: 387,390

[22] Filed: Feb. 13, 1995

Related U.S. Application Data

[63] Continuation of Ser. No. 5,365, Jan. 19, 1993, abandoned.

[30] Foreign Application Priority Data

Jan. 24, 1992 [JP] Japan .................................. 4-011162
Jan. 12, 1993 [JP] Japan .................................. 5-003558

[51] Int. Cl.$^6$ .................................................. B23K 31/00
[52] U.S. Cl. .......................... 428/623; 428/629; 428/633; 428/654; 428/471
[58] Field of Search .................... 428/623, 654, 428/632, 469, 471, 633, 629

[56] References Cited

U.S. PATENT DOCUMENTS

| | | | |
|---|---|---|---|
| 3,460,971 | 8/1969 | Bonis et al. | 428/623 |
| 3,844,823 | 10/1974 | Hofmann et al. | 117/119 |
| 4,050,956 | 9/1977 | de Bruin et al. | 428/433 |
| 4,344,503 | 8/1982 | Nakamura et al. | 181/170 |
| 4,699,310 | 10/1987 | Kohno et al. | 228/122 |
| 4,749,118 | 6/1988 | Yokoi et al. | 228/208 |
| 4,764,341 | 8/1988 | Flaitz et al. | 428/469 |
| 4,793,967 | 12/1988 | Pryor et al. | 419/19 |
| 4,811,893 | 3/1989 | Kanahara et al. | 228/198 |
| 4,911,987 | 3/1990 | Sakata et al. | 428/469 |
| 5,011,725 | 4/1991 | Foster | 428/137 |
| 5,073,527 | 12/1991 | Newkirk et al. | 501/127 |

FOREIGN PATENT DOCUMENTS

| | | |
|---|---|---|
| 0119649 | 9/1984 | European Pat. Off. . |
| 1471175 | 8/1970 | Germany . |
| 1471174 | 12/1970 | Germany . |
| 3307702 | 9/1984 | Germany . |
| 3537161 | 4/1987 | Germany . |
| 60-71579 | 4/1985 | Japan . |
| 60-243245 | 12/1985 | Japan . |
| 62-72577 | 4/1987 | Japan . |
| 62-182166 | 8/1987 | Japan . |
| 1023115 | 3/1966 | United Kingdom . |
| 1352775 | 5/1974 | United Kingdom . |

OTHER PUBLICATIONS

Katz, "Adhesion of Copper . . . Spinel Structure Interface", Thin Solid Films, 33(1976) 99–105 No month.
Abstract for JP 60–072,577 (Apr. 1987).
Grünling, Hermann W.: "Hochtemperaturbeständige Keramik–Metall–Vervindungen" In: SchweiBen und Schneiden Jg. 25, 1973, H.2, pp. 52–55 No month.
Lendle, Erberhard: "Metallverbindungen in Lufttrocknenden und Einbrennbaren Lack– und Siebruck–Bindemitteln" In: Metalloberfläche 28, 1974, H.2, pp. 64–69; insb.S.69 re.Sp., Abs. 4 u.5 No month.
Chemical Abstracts, vol. 93 (1980), p. 297, 93:244171t (1980) No month.
Derwent Reference Nr. 73–19849/15 zu DE 2,244,773 A. (Mar. 1973).
Derwent Reference Nr. 86–130645/20 zu SU 1,188,183 A. (Oct. 1985).
Derwent Reference Nr. 88–152711/22 zu JP 3,095,182 A. (Apr. 1988).
Derwent Reference Nr. 82–36161E/18 zu JP 57–051257 A. (Mar. 1982).
Derwent Reference Nr. 87–132482/19 zu JP 62–2072–577 A. (Apr. 1987).

*Primary Examiner*—Ngoc-Yen Nguyen
*Attorney, Agent, or Firm*—Parkhurst, Wendel & Burr

[57] ABSTRACT

A multi-layer metal-ceramic material including an alumina layer and a metallic layer including an Mg-containing alloy. The alumina layer and metallic layer are bonded together via a reaction layer including $MgAl_2O_4$ spinel. The alumina and metallic layers are pressed together and heated to a temperature below the solidus of the Mg-containing alloy, whereby the Mg migrates through the metallic layer to the interface and reacts with the alumina layer to form the spinel reaction layer. The bonded interface is excellent in resistance to Na attack.

3 Claims, 7 Drawing Sheets

Al (2p)

Si (2p)

Mg (2s)

O (1s)

Al (2p)

Si (2p)

Mg (2s)

O (1s)

End of Bonding

Spinel Forming Reaction

Oxide Film Formation

METAL CERAMIC COMPOSITE STRUCTURE

This is a Continuation of application Ser. No. 08/005,365 filed Jan. 19, 1993, now abandoned.

BACKGROUND OF THE INVENTION

The present invention relates to a bonded metal-ceramics material or member and how to bond them together. In particular, the invention concerns a material or member which consists of alumina, magnesia or spinel and an aluminum alloy bonded together and how to bond them together.

As disclosed in JP-A-60-71597, JP-A-62-72577 and JP-A-62-182166, the bonding of alumina to metal is conventionally achieved by inserting between the surfaces of the alumina and metal to be bonded together a three-layer insert material that consists of a core material made of aluminum or an aluminum alloy and skin materials made of an aluminum-silicon matrix alloy and pressing them together at a temperature that is not lower than the solidus of the aluminum-silicon matrix alloy forming the skin materials but not higher than the melting point or solidus of the core material. As disclosed as well, the Al—Si matrix alloy mentioned above may be any desired Al—Si—Mg alloy. These traditional methods are not only common in terms of the structure of the insert material used, but also make use of a bonding temperature that is not lower than the solidus of the Al—Si matrix alloy forming the skin layers of the insert material.

Moreover, JP-A-60-71597 teaches that the reason for using an Al—Si—Mg alloy for the skin layers of the three-layer insert material is that Mg is effective for improving the wettability of an Al—Si matrix alloy melt with respect to alumina and Fe.

Such aluminum-alumina bonding has so far been considered to be due to chemical reactions such as the reduction of alumina or impurities contained in it by an Al melt or mechanical actions caused as by an anchoring action of micropores on the surface of alumina, but these considerations appear not to be accurate.

Some plausible mechanism of how bonding takes place is still unclarified as mentioned above, but it is somehow possible to achieve the bonding of alumina to metal by conventional methods.

However, when the bonding of alumina to metal is carried out at a temperature not lower than the solidus of the Al—Si matrix alloy forming the skin layers of the insert material, as done in the prior art mentioned above, there are some problems. For instance, the insert material is placed under insufficient thickness control, making unstable the relaxation of thermal stress occurring due to a difference in the coefficient of thermal expansion between alumina and metal. In addition, a melt of the Al—Si matrix alloy forming the skin layers of the insert material reacts directly with the surface of the metal element to be bonded at the bonding temperature, thus between the Al—Si matrix alloy and the metal there can be formed a brittle intermetallic compound layer, which may and fail to give rise to microcracks during cooling, and fail to give an airtight bonded interface. One approach to solving these problems is to make the thickness of the insert material larger than 2 mm, as set forth in JP-A-62-72577. Another approach is proposed in JP-A-62-182166, in which a Cr layer or a layer composed mainly of Cr is provided on the surface of the metal to be bonded.

One object of the invention is therefore to provide a bonded metal-ceramics material having an airtight bonded interface and a simple method for bonding them together, inter alia, to provide a bonded alumina-metal material and a method for bonding them together and to provide a metal-ceramic composite structure in which the bonded metalalumina material is further bonded to another metal material.

Another object of the invention is to provide a bonded metal-ceramics material having a bonded interface of high strength and excellent airtightness and a simple method for bonding them together, inter alia, to provide a bonded magnesia or spinel-metal material and a method for bonding them together and to provide a metal-ceramics composite structure in which the bonded metal-magnesia or spinel material is further bonded to another metal material.

SUMMARY OF THE INVENTION

Taking the bonding of alumina to metal as an example, the bonded metal-ceramics material according to the invention is characterized in that in the bonded interface of an alumina element and a metallic element there is a reaction layer that comprises (1) spinel ($MgO.Al_2O_3$), or (2) spinel and at least one substance selected from the group of consisting of $Al_2O_3$, MgO, Al and O. In this case, at least the surface of the metallic element to be bonded to alumina is made up of a magnesium-containing alloy.

In the method for producing a bonded metal-ceramics material according to the invention, an alumina element is heated and held together with a metallic element, at least the surface thereof to be bonded to said alumina element being made of a magnesium-containing alloy layer, at a temperature that is not higher than the solidus of said alloy layer. The metallic element comes into contact with the surface of said alumina element, and are then pressed together, thereby forming on the bonded interface of said alloy layer and said alumina element a reaction layer that comprises spinel ($MgO.Al_2O_3$) or spinel and at least one substance selected from the group consisting of $Al_2O_3$, MgO, Al and O.

In the metal-ceramics composite structure according to the invention, alumina and metallic elements are bonded together on the bonded interface thereof through a reaction layer comprising spinel ($MgO.Al_2O_3$) or spinel and at least one substance selected from the group consisting of $Al_2O_3$, MgO, Al and O and the thus bonded metal-ceramic material is bonded to another metal material through said metallic element.

Preferably, a three-layer structure made up of a core layer of an Mg-containing alloy, an Mg-containing Al alloy or pure Al and surface layers, each of an Mg-containing Al alloy, is used for the metallic element. More preferably, the Mg-containing Al alloy is an Al—Si—Mg alloy.

The other metal material mentioned above may be made of a metal suitable for the intended purpose of the composite structure and the bonding of the metallic element to the other metal may be achieved by metallurgical bonding procedures such as diffusion bonding, welding and hard soldering, mechanical bonding procedures such as interference fitting, or any desired combination thereof.

The "spinel" constituting the reaction layer that is formed on the bonded interface between the alumina and metallic elements constituting the bonded metal-ceramics material of the invention is generally a double oxide having the chemical formula $MgAl_2O_4$. It is noted, however, that not only that double oxide but also compounds deviating from this composition in terms of the ratio of Mg, Al and O and solid solutions of these compounds with Mg, Al and at least one inevitable impurities may be used for the invention.

When the alumina and metallic elements are heated to the bonding temperature with an Mg-containing alloy sandwiched between them, the Mg diffuses onto and over the surface of the Mg-containing alloy in the course of heating, so that the Mg can concentrate on that surface. Then, the Mg in the surface layer of that alloy can react with the alumina element at a temperature that is not higher than the melting point of that alloy, thus forming the spinel mentioned above. It is then desired that the spinel be formed all over the bonded interface of that alloy and alumina. However, it is understood that such spinel may additionally contain $Al_2O_3$, MgO and Al in the form of a mixture.

Reference will now be made to the application of the invention to bonding magnesia or spinel to metal.

The bonded magnesia or spinel and metallic elements according to the invention are characterized in that between the metallic element and the magnesia or spinel element there is present a reaction layer that comprises spinel ($MgO.Al_2O_3$) and at least one substance selected from the group consisting of $Al_2O_3$, MgO, Al and O.

The metallic element mentioned above, for instance, may be pure Al or an Al alloy, and is provided at least on the surface to be bonded to magnesia or spinel with a layer of pure Al or an Al alloy, for instance. It is then desired that the metallic element be made up of a three-layer structure that comprises a core layer consisting of pure Al and surface layers of pure Al or an Al alloy, each being previously provided at least on the surface to be bonded to magnesia or spinel with an oxide film.

The method for producing a bonded metal-ceramics material according to the invention is characterized in that while the surface of a magnesia or spinel element is in contact with a metallic element wherein at least the surface to be bonded to magnesia or spinel is made up of a layer of pure Al or an Al alloy, both elements are heated in an oxidizing atmosphere and at a temperature that is not higher than the solidus of the pure Al or Al alloy to form oxide films on their surfaces and then pressed together, thereby forming on the bonded interface of the layer of pure Al or an Al alloy and the magnesia or spinel element a reaction layer that comprises spinel ($MgO.Al_2O_3$) and at least one substance selected from the group consisting of $Al_2O_3$, MgO, Al and O. Preferably, the then oxide film is made up of alumina. The metallic element mentioned just above, for instance, may comprise pure Al or an Al alloy. In the invention, it is noted that the metallic element is of a three-layer structure that, for instance, is made up of a core material layer of pure Al and surface layers, each being provided at least on the surface to be bonded to magnesia or spinel with pure Al or an Al alloy.

Alternatively, the metallic element may be provided by thermally or otherwise pretreating pure Al or an Al alloy to form an oxide film on the surface to be bonded. It is then noted that the bonding atmosphere used may not reduce the surface of the metallic element.

The metal-ceramics composite structure according to the invention is characterized in that magnesia or spinel and metallic elements are bonded together on their bonded interface through a reaction layer that comprises spinel ($MgO.Al_2O_3$) and at least one substance selected from the group consisting of $Al_2O_3$, MgO, Al and O to form a bonded metal-ceramics material and the bonded metal-ceramics material is then bonded to another metal through the metallic element. It is here noted that the metallic element bonded to at least the magnesia or spinel element is characterized by being pure Al or an Al alloy and the another metal by being an Al alloy. It is also noted that the metallic element is of a three-layer structure that is made up of a core material layer of pure Al and surface layers, at least the side to be bonded to magnesia or spinel being provided with pure Al or an Al alloy, and the other metal is an Al alloy, for example.

In one specific example of the bonded metal-ceramics material according to the invention, i.e., in a bonded meta-lalumina material, spinel ($MgO.Al_2O_3$) is formed on the bonded interface by the chemical reaction between $Al_2O_3$ and MgO, thereby making chemical bonding between alumina and the metal. The $Al_2O_3$ of the spinel comes from the $Al_2O_3$ which is to be bonded to MgO. For MgO that is another constituent of the spinel, use is made of MgO that is produced by the reducing reaction of alumina by Mg in the alloy. In order to promote this reducing reaction, the Mg in the Mg-containing alloy is heated in a non-oxidizing atmosphere, so that the Mg can concentrate on the surface of the alloy. The reaction between $Al_2O_3$ and Mg and MgO takes place by bringing the Mg-containing alloy, on the surface which Mg concentrates, into contact with the surface of alumina and pressing them together. It is noted that the non-oxidizing atmosphere used may be vacuum, nitrogen, an inert gas, and so on.

Preferably, bonding should be carried out at a temperature that is as high as possible but at which the Mg-containing alloy does not melt. At a temperature at which the Mg-containing alloy melts, the Mg that has concentrated on the surface of that alloy again dissolves in it or evaporates off, and so decreases in concentration, resulting in a lowering of its reactivity to alumina. In addition, the Al and Si in the alloy melt come into contact with the surface of alumina, causing obstruction to direct contact between alumina and Mg.

In the invention, a reaction layer composed mainly of spinel is formed on the bonded interface of the alumina element and the metallic element comprising the Mg-containing alloy, thereby making bonding between alumina and the Mg-containing alloy. This is because spinel is not only chemically stable and excellent in corrosion resistance but has a coefficient of thermal expansion close to that of alumina as well, as shown in Table 1. Another reason is that spinel forms a solid solution in a relatively wide composition range, as can be seen from FIG. 1.

TABLE 1

| Materials | Chemical Formulae | Coefficients of Thermal Expansion, $\times 10^{-6}$/°C. |
|---|---|---|
| Alumina | $Al_2O_3$ | 8.6 |
| Magnesia | MgO | 13.5 |
| Silica | $SiO_2$ | 0.5 |
| Spinel | $MgO.Al_2O_3$ | 8.8 |
| Mullite | $3Al_2O_3.2SiO_2$ | 5.3 |

For the oxides, the measurements were obtained at 20° to 1,000° C. and for Al, the measurements were obtained at 20° to 400° C.

As already noted, it is preferable that the reaction layer formed on the bonded interface of the alumina and metallic elements has a coefficient of thermal expansion close to that of alumina, because this means that thermal stress occurring on the interface of the reaction layer and alumina is small. It is also preferable that the reaction layer forms a solid solution, the composition of which may vary widely, because this implies that the desired reaction layer occurs easily, even when the ratio of MgO and $Al_2O_3$ that react with each other suffers some deviation.

In the production of the bonded metal-ceramics material according to the invention, the metal material which forms the metallic element or at least the surface layer of the metallic element to be bonded to alumina is a matter of choice, and the choice may be made while taking its melting point, hardness, corrosion resistance, and so on depending on for its intended purpose, a difference in the coefficient of thermal expansion between the alloy and ceramics elements, environmental conditions such as temperature and atmosphere. However, it is preferable to use a metal material that produces an oxide having a standard free energy larger than that of MgO. A metal material, the oxide of which has a standard free energy smaller than that of MgO, is not preferable for the substrate or additives for the metallic element, because it is oxidized earlier than MgO to form an oxide film on the surface of the metallic element, causing obstruction to spinel formation. Specific, but not exclusive, examples of such metals are Ca, Be and Ce.

For instance, when producing a composite structure comprising an alumina element and a metallic element of an Al alloy by their concurrent bonding with a metallic insert material of an Al alloy sandwiched between them, it is preferable to use an Al matrix alloy having a melting point not higher than that of the metallic element of an Al alloy as the alloy that forms the metallic insert material or its surface layers. This is because the bonding temperature is limited by the melting point of the metallic element of an Al alloy. For metallic components other than Mg, that are added to such an Al matrix alloy, use preferably should be made of elements that lower the melting point of the Al matrix alloy or have a favorable influence on Mg diffusion. Preferably the component to be added to the Al-Mg alloy is Si, because it lowers the melting point of the Al matrix alloy, or forms an intermetallic compound, i.e., $Mg_2Si$, that has a favorable influence on the diffusion of Mg onto the surface of the alloy. Of course, metal elements that are other than Mg but behave in much the same manner as Si in the Al—Mg alloy are effective as additive components.

According to the invention, it is noted that the bonding of the ceramics element to the metallic element concurs with the bonding of the metallic element to metal material. In this case, the bonding of the metallic element to the metal material is carried out by the so-called diffusion bonding, because it occurs at a temperature that is not higher than the melting point of the metallic element. If an acceptable bonded material is not obtained due to the fact that a brittle intermetallic compound occurs on the bonded interface of the metallic element and the metal material, the formation of such an intermetallic compound is then avoided by metallizing the surface of the metal material to be bonded. In the case of some combination of the metallic element with the metal material that is found to fail to give any desired bonded material, it is preferable to use a metallic element of a three-layer structure, the surface layer of the metallic element to be bonded to the metal material being made up of an alloy that is easily bonded to it.

BRIEF DESCRIPTION OF THE DRAWINGS

The present invention will now be explained, more specifically but not exclusively, with reference to the accompanying drawings, in which.

EXAMPLES

Figure 1:
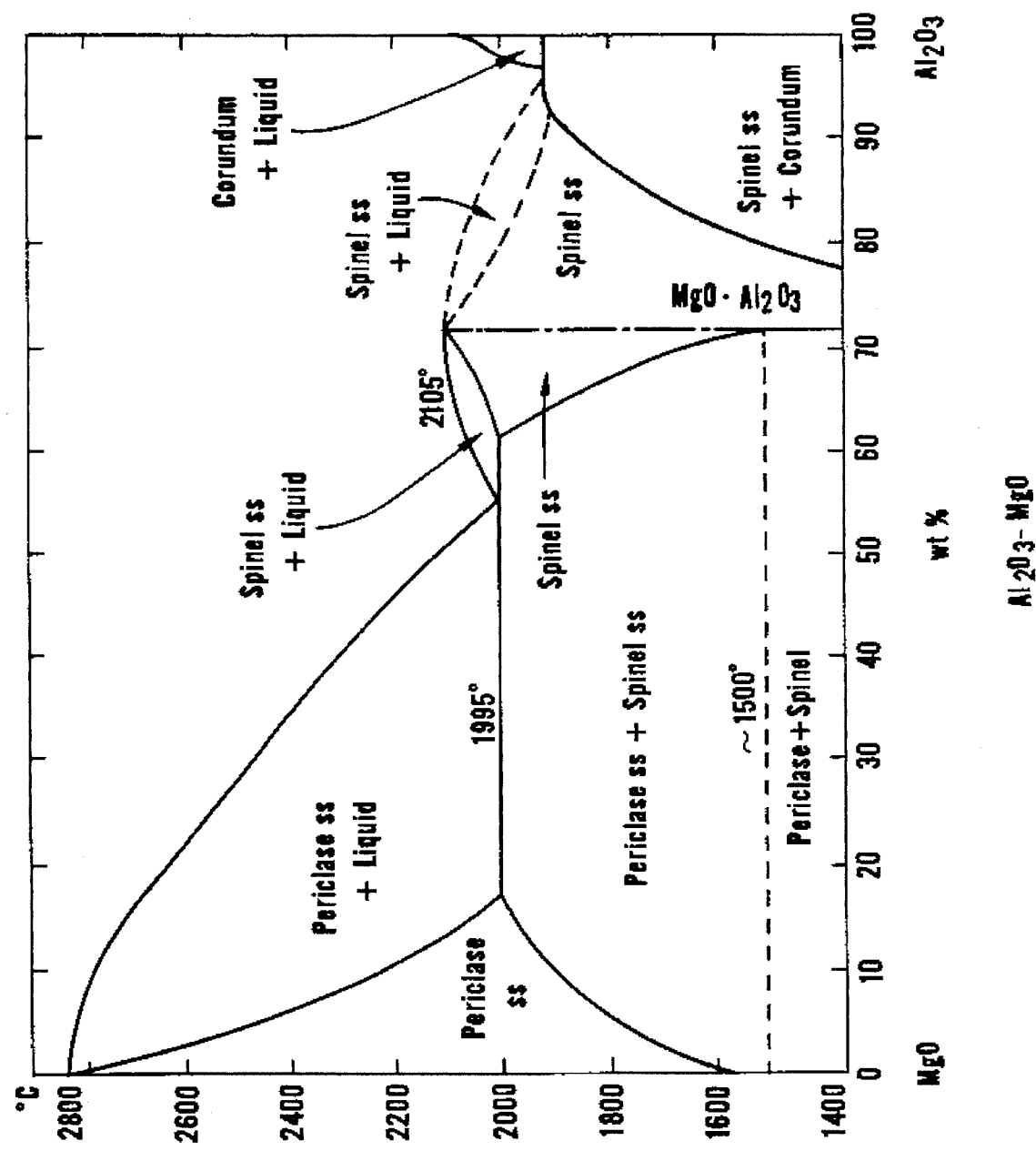
FIG. 1 is an equilibrium phase diagram of $Al_2O_3$—MgO that shows the presence of a spinel solid solution.
Figure 2:
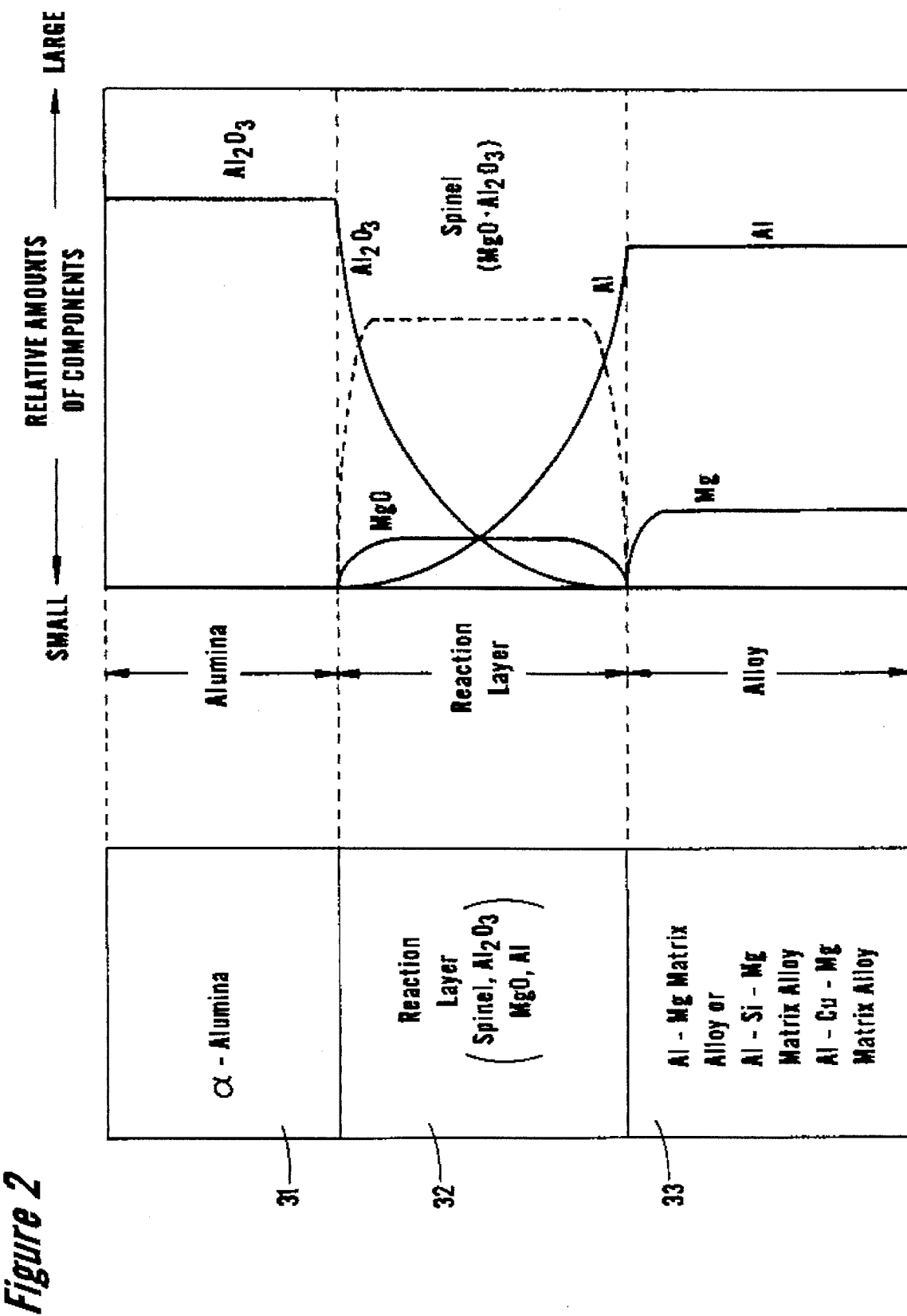
FIG. 2 is a schematic diagram that illustrates the reaction layer forming the bonded interface of alumina and the Mg-containing Al alloy according to one example of the invention and the relative amounts of components in the vicinity of that bonded interface.
Figure 3A:
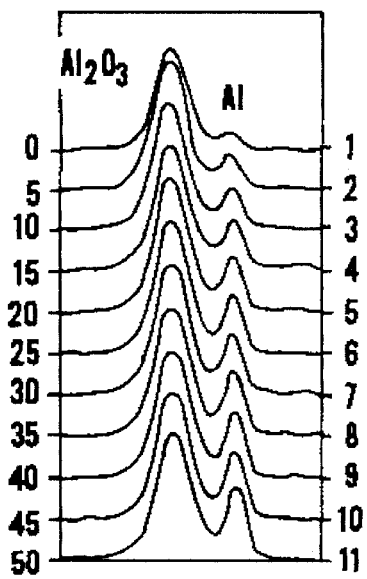
FIGS. 3(A)–3(D) show the results of XPS measurement of the surface of an Al-10 wt. % Si–1.5 wt. % Mg alloy prior to heated to the bonding temperature.
Figure 3B:
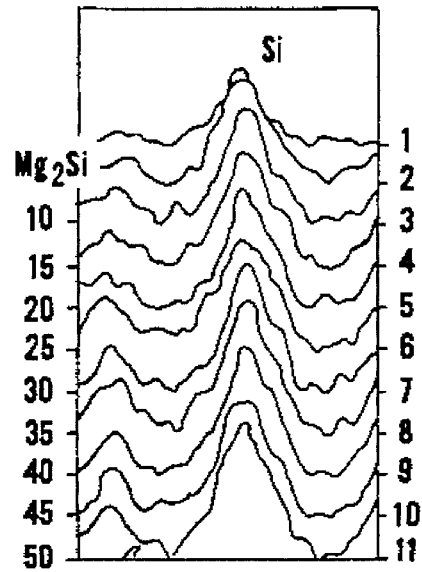
Figure 3C:
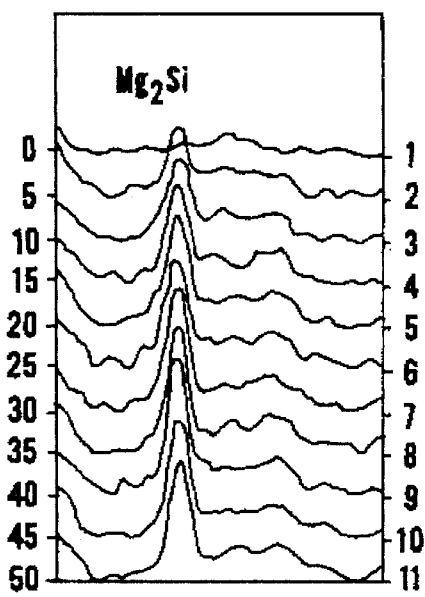
Figure 3D:
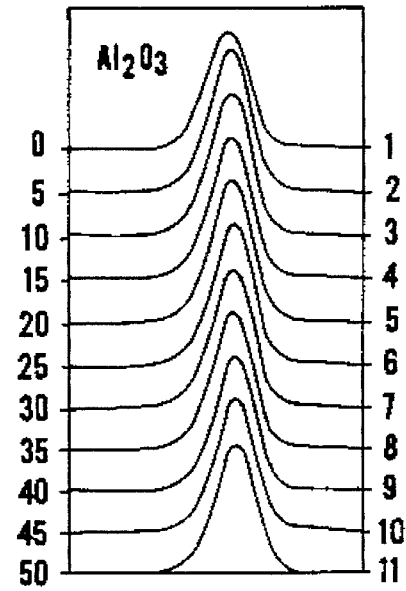
Figure 4A:
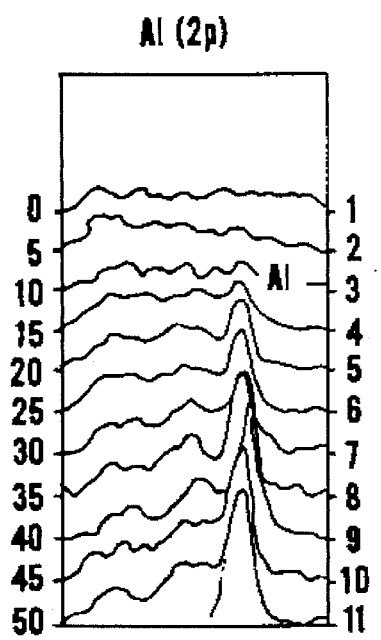
FIGS. 4(A)–4(D) show the results of XPS measurement of the surface of an Al-10 wt. % Si–1.5 wt. % Mg alloy after heated to the bonding temperature.
Figure 4B:
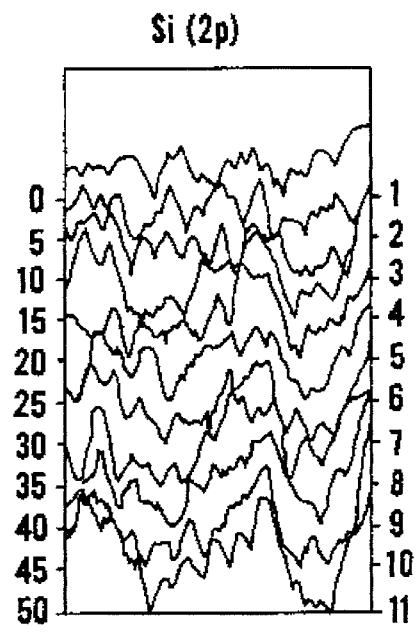
Figure 4C:
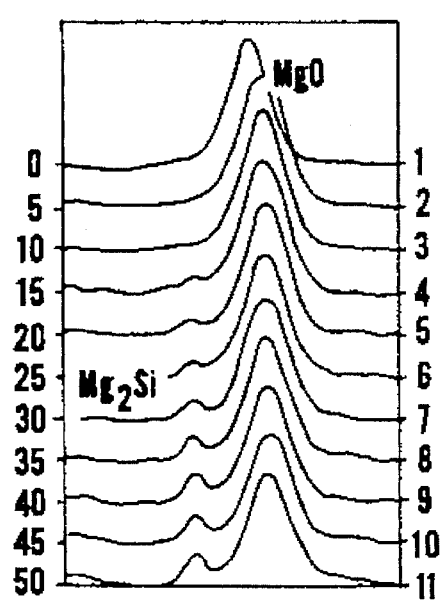
Figure 4D:
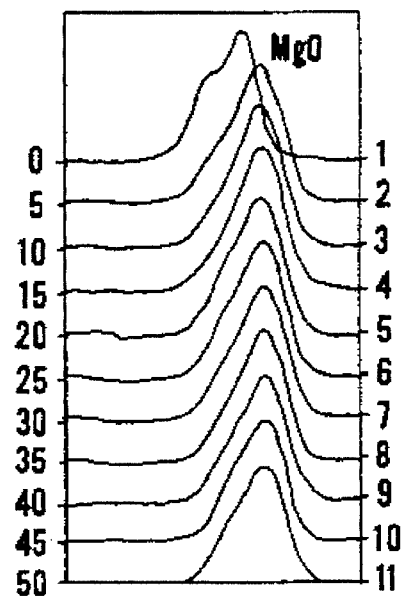

Componential analysis was first done for some section through the bonded interface of an α-alumina element and a metallic element made up of an Mg-containing Al alloy. As expected, it has been confirmed that the reaction layer occurs on the bonded interface. FIG. 2 is a schematic diagram prepared from the constituents of the reaction layer formed on the bonded interface which were presumed from the obtained results.

In the bonded metal-ceramics material according to the invention, between the α-alumina ceramics element 31 and the metallic element 33 made of an Mg-containing Al alloy there is present a reaction layer 32, as can be seen from FIG. 2. This reaction layer is presumed to be made up of spinel ($MgO.Al_2O_3$), MgO, $Al_2O_3$ and Al. The concentration of Al in the reaction layer decreases continuously from the surface of the metallic element toward the surface of alumina. The concentration of $Al_2O_3$ decreases continuously from the surface of alumina toward the surface of the metallic element, while spinel and MgO have a uniform concentration distribution throughout the reaction layer.

Experimental Examples 1 & 2

Reference will now be made to evidence that shows the presence of the reaction layer on the bonded interface of the alumina and metallic elements with reference to Experimental Examples 1 and 2.

Experimental Example 1 (shows that the layer of concentrated MgO is formed on the surface of the metallic element by heating In Experimental Example 1, a metallic element made up of an Al-10 wt. % Si–1.5 wt. % Mg alloy was heated at 550° C. which is about 10° C. lower than the solidus of the alloy in a vacuum atmosphere of $10^{-3}$ Pa. Then, the composition of the surface layer of that alloy was analyzed by X-ray photoelectron spectrometry (hereinafter "XPS") for the purpose of comparison with that of the surface layer prior to heating. The obtained results are shown in Table 2 and FIGS. 3(A)–3(D) and 4(A)–4(D). The analysis was done with XPS equipment (ESCA-1000 made by Shimadzu Corporation) over a spot of 0.6 mm in diameter at 8 KV and 30 mA. Depthwise analysis was done by repeating measurements whenever the surface was removed by ion etching at an interval of 50 nm.

The surface compositions as measured before and after the alloy was heated are shown in Table 2 that teaches that Al, $Al_2O_3$ and Si are detected from the surface of the alloy before heating, while MgO alone is detected from the surface of the alloy after heating.

TABLE 2

| | Results of XPS Analysis | | | | |
| --- | --- | --- | --- | --- | --- |
| | Al | Si | $Mg_2Si$ | MgO | $Al_2O_3$ |
| Before Heating | D | D | ND | ND | D |
| After Heating | ND | ND | ND | ND | ND |

D: Detected
ND: Not Detected

Shown in FIGS. 3(A)–3(D) are the results of the concentrations of Al, Si, Mg and O as measured from the surface of the alloy-before-heating in the depthwise direction. The etching time referred to in this FIGS. 3(A)–3(D) means a time for which the sample surface is removed by ion etching at a rate of 10 nm per minute. FIG. 3 shows the results of the sample as repeatedly measured to a surface depth of 200 nm (0.2 μm), while the sample was removed by ion etching at a time interval of 5 minutes. Likewise shown in FIG. 4 are the results of the same alloy sample as measured in much the same manner, which was heated in a vacuum atmosphere of $10^{-3}$ Pa to 550° C. which is about 10° C. than the solidus of the alloy and then cooled down. The results given in FIG. 4 reveal the surface state of the metallic element just before being pressed at a predetermined bonding temperature when obtaining the bonded metal-ceramics material according to the invention.

As can be understood from the comparison of FIGS. 3(A)–3(D) with FIGS. 4(A)–4(D), the surface of the alloy-before-heating is observed to have an $Al_2O_3$ peak—see FIGS. 3 (A) and (D) and a Si peak—see FIG. 3 (B). At a surface depth of 50 nm, $Al_2O_3$, Mg2Si—see FIG. 3(C) and Si are observed to have peaks. The Al, Mg2Si—see FIG. 3(C) and Si peaks tend to become sharper with depth. The surface of the alloy-after-heating, on the other hand, is observed to have a MgO (see FIG. 4 (C) ) peak alone, but the $Al_2O_3$ peak disappears. At a surface depth of 50 nm, there are observed Al (FIG. 4(A)), MgO and Mg2Si peaks. The Al peak tends to become sharper with depth, but the MgO peak becomes sharpest on the surface. This appears to be due to the fact that the Mg is diffused by heating beyond the $Al_2O_3$ surface that has been present on the surface of the alloy before heating and so reduces the $Al_2O_3$ to form an MgO layer. In the case of the alloy-after-heating, no Si could be detected even at a surface depth of 200 —nm see FIG. 4(B).

From what has been described, it is apparent that when a metallic element made up of the Al-10 wt. % Si-1.5 wt. % Mg alloy is heated to 550° C. not higher than the solidus of that alloy in a vacuum atmosphere of $10^{-3}$ Pa, a concentrated layer of MgO is formed on the surface of that alloy. Consequently, if the metallic and alumina elements are pressed together at high temperature while the concentrated MgO layer on the surface of the former is in contact with the latter, thereby inducing the reaction of Mg with alumina, it is then possible to obtain the bonded metal-ceramics material according to the invention. It is understood that the alloy that gives such a concentrated MgO layer by heating is not limited to the Al-10 wt. % Si-1.5 wt. % Mg alloy, and this would be apparent to those skilled in the art, if attention is directed to the fact that the diffusion of Mg onto the surface of an alloy other than that alloy takes place.

Experimental Example 2 (Composition of the reaction layer on the bonded interface of alumina and an Al—Si—Mg alloy)

In the instant example, an alumina round rod of 12 mm in diameter and 20 mm in length and an Al—Mn alloy column of 12 mm in diameter and 0.8 mm in thickness were pressed together in a vacuum atmosphere of $10^{-3}$ Pa and at 4 kg/mm² and 550° C., which is about 10° C. lower than the solidus of that alloy sheet, with an Al-10 wt. % Si-1.5 wt. % Mg alloy sheet sandwiched between them, thereby preparing a bonded composite material. Then, investigations were made on whether or not the reaction layer formed on the bonded interface of alumina and the alloy sheet was of such a composition as intended in the invention. In this example, the alumina round rod, Al—Mn alloy column and Al—Si—Mg alloy sheet correspond to the ceramics element, metal material and metallic element referred to in the present disclosure, respectively. Also, the bonded composite material corresponds to the metal-ceramics composite structure referred to in the present disclosure.

Subsequently, a disk member of about 10 mm in thickness was cut out of the thus obtained bonded material, including both the Al-10 wt. % Si-1.5 wt. % Mg alloy layer and the alumina portion, in the direction parallel with its bonded interface, and then mechanically abraded from the alloy layer side until the thickness of that alloy was about 5 μm, thereby preparing a sample. The composition of the sample was then analyzed by XPS to a surface depth of approximately 10 μm. The analysis followed the same conditions as in Example 1, with the exception that about 250 nm was removed by ion etching per measurement. The results are shown in FIG. 5.

Figure 5:
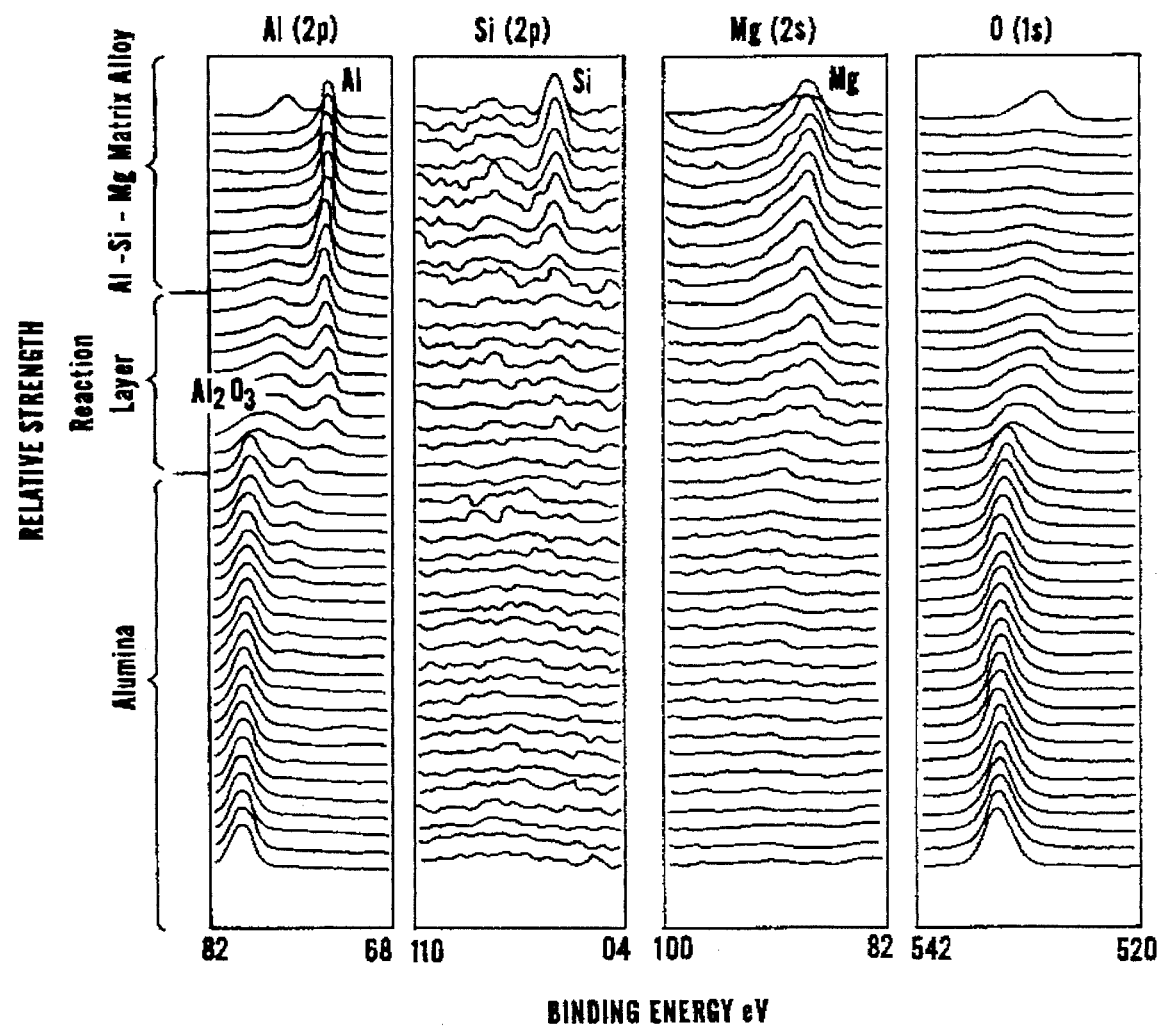
FIG. 5 shows the results of XPS measurement of the bonded interface of alumina and an Al-10 wt. % Si–1.5 wt. % Mg alloy according to one example of the invention.

As can be best seen from FIG. 5, the composition of the sample in the vicinity of the bonded interface can be broken into three composition zones.

(A) Zone having a surface depth of ca. 2.5 μm

This zone is considered to be the Al—Si—Mg alloy layer, because Al, Si and Mg that are the constituents of the Al—SiMg alloy can be detected.

(B) Zone having a surface depth of ca. 2.5 μm to ca. 5 μm

This zone is considered to be the reaction layer of the Al—Si—Mg alloy layer with alumina, because $Al_2O_3$, Al, Mg and O can be detected. From the Mg detected from this zone, it is found that, with depth, the energy peak location shifts from the position of the metal Mg to a high-energy side that is close to the MgO position. To put it another way, this suggests that such a peak is not due to metal Mg.

(C) Zone having a surface depth of ca. 5 μm or above

This zone is considered to be the alumina layer, because it is composed of $Al_2O_3$ and O alone.

For the purpose of comparison, a sintered spinel body was measured for its energy peak location in the same manner as mentioned above. As a result, that location was substantially found at the same positions as $Al_2O_3$ and MgO. In other words, there is a possibility that the spinel peak may overlap with the $Al_2O_3$ peak and the Mg peak shifting to a high-energy side, both measured in the zone (B).

As can be understood from the results mentioned above, it has been confirmed that on the bonded interface of alumina and the Al—Si—Mg alloy layer there is formed the reaction layer that comprises spinel ($MgO.Al_2O_3$) or spinel and at least one substance selected from the group consisting of $Al_2O_3$, MgO, al and O.

Experimental Example 3 shows that the bonded interface of a bonded material made by the method of the invention has excellent bonding strength and corrosion resistance)

In the instant example, the bonding strength and corrosion resistance of a bonded metal-ceramics material produced by the method (solid-state bonding) of the invention were compared with those of a bonded material produced by a conventional method.

Alumina round rods, each of 12 mm in diameter and 20 mm in length, were located on both ends of a metallic element of a three-layer structure in which an Al—Mn alloy column of 12 mm in diameter and 0.8 mm in thickness was provided on both its sides with a pure—Al sheet of 12 mm in diameter and 0.5 mm in thickness that was provided on both its sides with Al-10 wt. % Si-1.5 wt. % Mg alloy foils, each having a thickness of 0.1, mm, thereby making an assembly. The assembly was set on a vacuum plate and then pressed together in a vacuum atmosphere of $10^{-3}$ Pa and at 4 kg/mm$^2$ and 550° C. that is about 10° C. lower than the solidus of the Al—Si—Mg alloy, thereby making a 12-mm diameter, about 40-mm long bonded material comprising a central region of the Al—Mn alloy and both end regions of alumina (a solid-state bonded material). For the purpose of comparison, a bonded material (a liquid-state bonded material; Comparative Example 1) was made following the same procedures mentioned just above, with the exception that bonding took place at 600° C., and another bonded material (a solid-state bonded material; Comparative Example 2) was obtained under the same conditions as mentioned just above, with the exception that a pure-Al metallic element was used at a bonding temperature of 600° C. Out of each bonded material, a fourpoint bending test piece of 3×4×40 mm in dimensions were cut, which comprised a central region of the Al—Mn alloy and both end regions of alumina. It is noted that the alumina round rod, Al—Mn alloy column and three-layered metallic element correspond to the ceramics element, metal material and metallic element referred to in the present disclosure.

piece according to Comparative Example 1 was broken by stress that is smaller than the flexural strength of alumina. In this case, the rupture was concentrated on the bonded interface, and this implies that the bonded interface according to Comparative Example 1 deteriorates considerably due to Na. In the case of the test piece according to Comparative Example 2, its flexural strength could not be determined, because the elements peeled off the bonded interface during dipping.

The above described effects are due to the fact that the bonded interface is made up of the reaction layer is not attacked by molten Na according to the present invention. Another reason the bonded material of the invention is not attacked by molten Na is that since it is produced by solid-state bonding, the Si particles in the Al—Si—Mg alloy forming a bonded layer between alumina and the Al—Mn alloy are dispersed throughout the Al matrix in a discrete, independent form. In the bonded material according to Comparative Example 1, by contrast, a number of Si particles likely to be corroded by molten Na attack are present in the bonded interface of alumina and the Al—Si—Mg alloy, because bonding has taken place at a temperature exceeding the melting point of the Al—Si—Mg alloy. In addition, the bonded material according to Comparative Example 1 is in a continuous form, as in a dendrite, because the Si particles, once melted, are crystallized out of the solution when solidified. For this reason, the bonded material according to Comparative Example 1 is expected to have the bonded interface inferior in terms of corrosion resistance to molten Na. Likewise, the bonded material according to Comparative Example 2 is expected to have a much inferior bonded interface in terms of corrosion resistance to molten Na, because the reaction layer formed between alumina and

TABLE 3

| | Ceramics Elements | Metallic Elements | Bonding Conditions | n | Four-Point Flexural Strength, MPa | |
|---|---|---|---|---|---|---|
| | | | | | As-Bonded | After immersion in Na |
| Ex.1 | Alumina | Al—Si—Mg Alloy/ pure Al/ Al—Si—Mg Alloy | Solid-State | 6 | 240 ± 8 | 235 ± 12 |
| Comp. Ex.1 | Alumina | Al—Si—Mg Alloy/ pure Al/ Al—Si—Mg Alloy | Liquid-State | 6 | 235 ± 12 | 120 ± 45 |
| Comp. Ex.2 | Alumina | Pure Al | Solid-State | 6 | 232 ± 20 | Peeling took place during immersion |

Set out in Table 3 are the results of the four-point flexural strengths, as measured, of these test pieces. In the as-bonded test pieces according to both the example and the comparative examples, ruptures were found in the alumina portion in the vicinity of the bonded interface, so that no true bonding strength could be obtained on the bonded interface of alumina and the metallic element. However, all the test pieces were found to have a flexural strength higher than that of alumina. In order to compare these bonded materials in terms of the corrosion resistance of their bonded interface, test pieces were prepared from them and then dipped in molten Na heated to 430° C. for 120 hours to determine their four-point flexural strengths. Consequently, the test piece according to the example was broken in the alumina portion as before immersion. In other words, deterioration of the bonded interface by Na was not found. In contrast, the test the metallic element differs from the reaction layer according to the invention.

Experimental Example 4

Figure 6C:
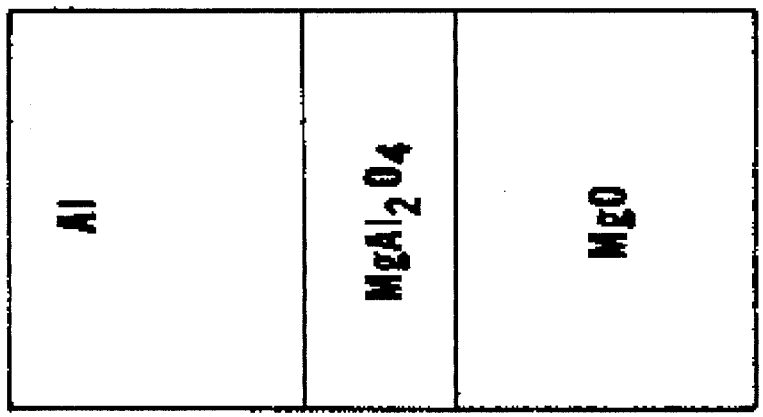
FIGS. 6(A)–6(C) are a schematic illustration of how aluminum is bonded to magnesia at the bonding steps according to Experimental Example 4 of the invention.
Figure 6B:
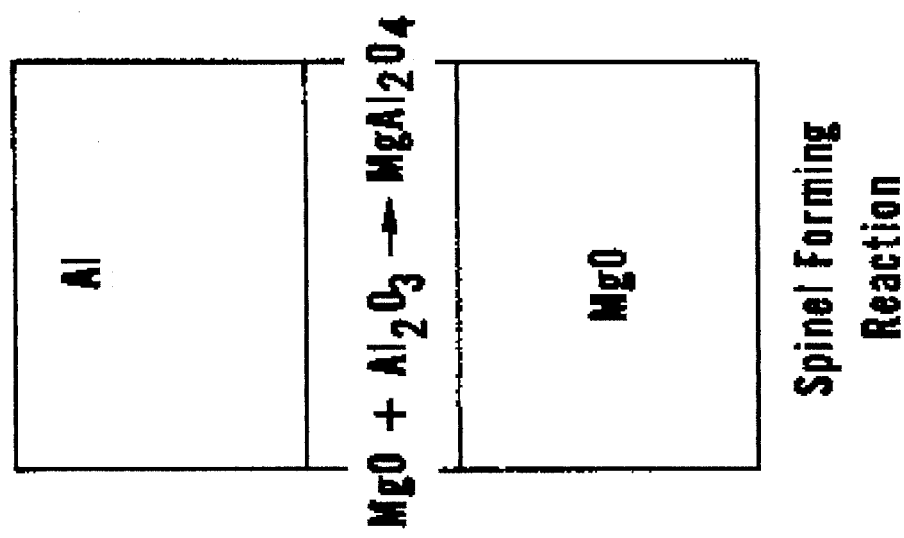
Figure 6A:
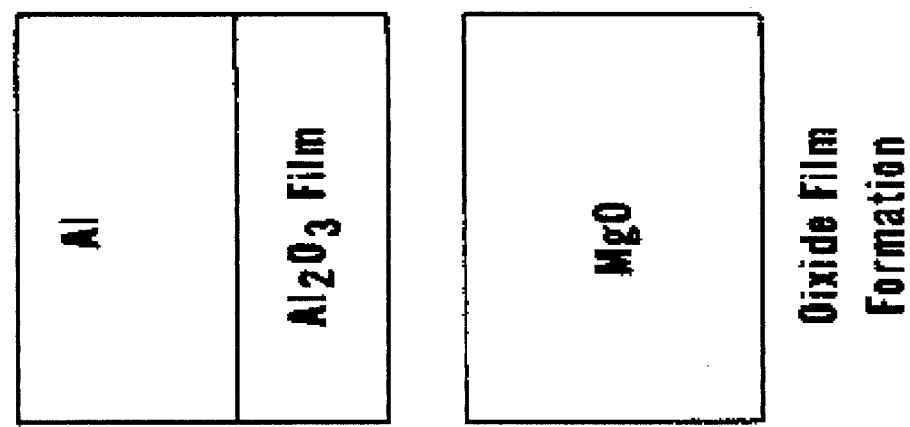

In the instant example, aluminum oxide films were formed on the surface of metallic aluminum by various methods, and then provided on their surfaces with magnesia (MgO), followed by pressing in vacuum and at 550° C. and 4 kg/mm$^2$ for bonding. This is typically illustrated in FIGS. 6(A)–6(C). FIG. 6(A) is an illustration of how the oxide film is formed; FIG. 6(B) is an illustration of the reaction through which spinel is formed during bonding; and FIG. 6(C) is an illustration of what state the bonded interface is in after bonding.

Figure 7:
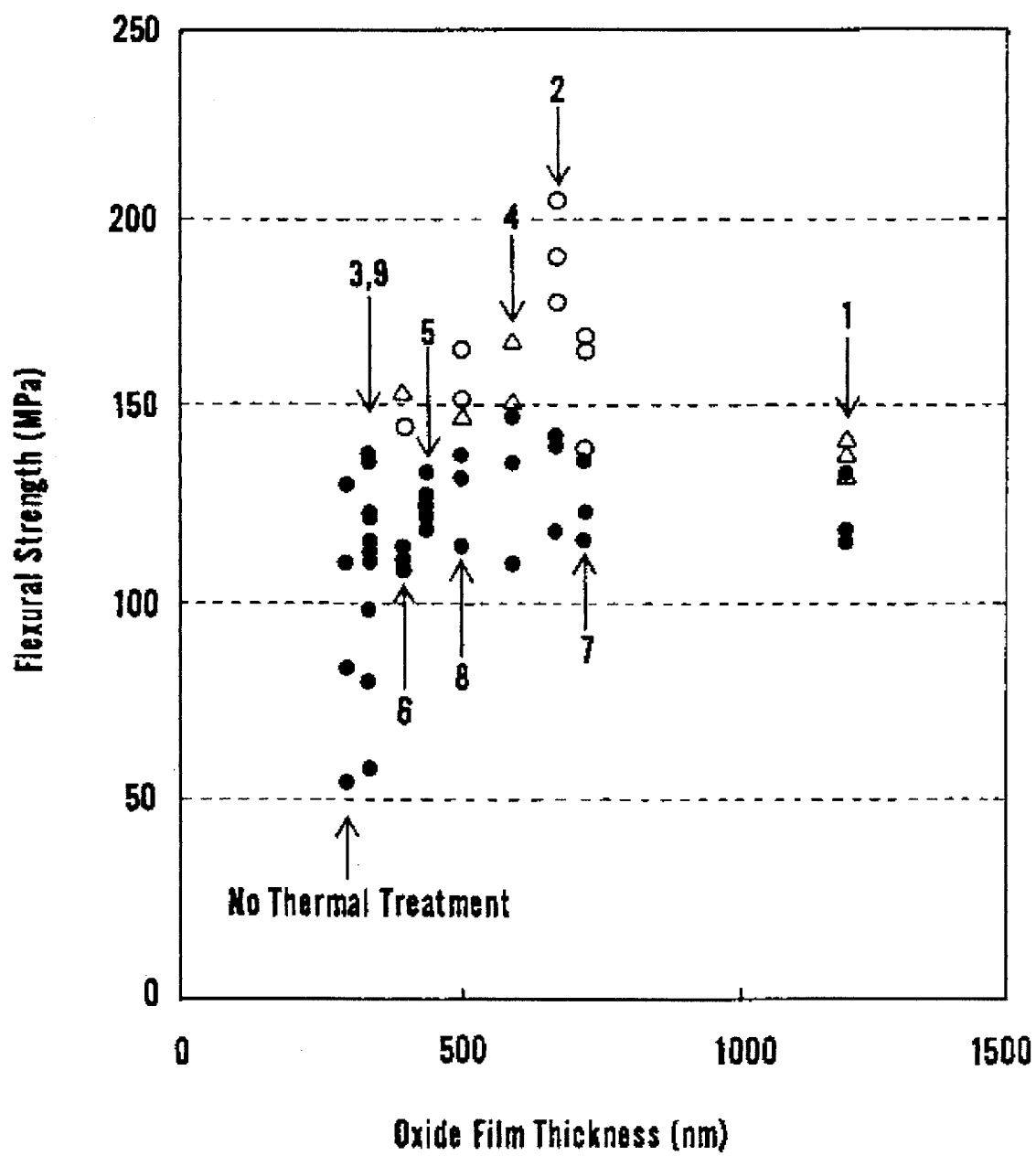
FIG. 7 is a characteristic diagram showing the relation between oxide film thickness and bending strength in Experimental Example 4 of the invention.

By experimentation, investigations were made on the relation between the alumina oxide film thickness and flexural strength of the bonded aluminum-magnesia materials. The results are shown in FIG. 7 and Table 4.

TABLE 4

| Ex. Nos. | Thermal Treatment Conditions for Oxide Film Formation | | | BS* MPa | Number of Samples |
|---|---|---|---|---|---|
| | Temp., °C. | RT**, min. | Atm. | | |
| 1 | 550 | 300 | Air | 130 ± 10 | 6 |
| 2 | 550 | 60 | $N_2$ | 162 ± 34 | 6 |
| 3 | 550 | 10 | Air | 121 ± 12 | 6 |
| 4 | 500 | 300 | Air | 143 ± 19 | 6 |
| 5 | 500 | 60 | Air | 124 ± 5 | 6 |
| 6 | 500 | 10 | $N_2$ | 129 ± 20 | 6 |
| 7 | 400 | 300 | $N_2$ | 141 ± 22 | 6 |
| 8 | 400 | 60 | Air | 141 ± 18 | 6 |
| 9 | 400 | 10 | Air | 119 ± 30 | 6 |
| 10 | No Thermal Treatment | | — | 90 ± 45 | 4 |

BS*: Bonding Strength
RT**: Retention Time

In FIG. 7, numerals denoting the Experiment Nos. referred to in Table 4, ○ shows that rupture takes place in ceramics, Δ indicates that where rupture takes place is unclear, and ● indicates that rupture takes place in the bonded interface.

Shown in Ex. Nos. 1–9 referred to in Table 4 are the bonding strengths of test pieces provided on the surfaces with oxide films in the atmospheres at the temperatures for the time periods, all referred to therein. Shown in Ex. No. 10 is the bonding strength of a test piece that was not thermally treated.

As can be understood from FIG. 7 and Table 4, the thermally treated test pieces (Ex. Nos. 1–9) increase relatively in flexural strength because of the spinel layers having been formed due to the reaction of the oxide films on the surface of aluminum with MgO. Bonding strength increases are incidental to an increase in oxide film thickness, and ceramic rupture is considered to be due to an increase in spinel reaction layer thickness.

Experimental Example 5

Various combinations of ceramic elements made up of alumina, magnesia and alumina having a spinel layer on the side to be bonded and metallic elements made up of pure aluminum and Al—Si—Mg alloys were bonded together in vacuum and air atmospheres for bonding. It is noted that bonding temperature and pressure were kept constant at 550° C. and 4 kg/mm².

The results are set out in Table 5.

TABLE 5

| | Ceramics Elements | Metallic Elements | Surface Films | Bonding Atmosphere | Bondability |
|---|---|---|---|---|---|
| Ex.2 | Alumina | Al—Si—Mg Alloy | MgO | In vacuo | Bondable |
| Ex.3 | Magnesia | Pure Al | $Al_2O_3$ | In air or pre-oxidation | Bondable |
| Ex.4 | Spinel*¹ | Al—Si—Mg Alloy | MgO | In vacuo | Bondable |
| Ex.5 | Spinel*¹ | Pure Al | $Al_2O_3$ | In air or pre-oxidation | Bondable |
| Comp. Ex.3 | Alumina | Pure Al | $Al_2O_3$ | In air | Not Bondable |
| Comp. Ex.4 | Magnesia | Al—Si—Mg Alloy | MgO | In vacuo | Not Bondable |

*¹As spinel, use was made of alumina ceramics that was provided on the surface with a spinel layer.

As can be understood from Table 5, if the films formed on the surfaces of the ceramic and metallic elements to be bonded to each other are made up of different substances (e.g., spinel and $Al_2O_3$), bonding is then possible because of the formation of a reaction layer comprising spinel or spinel and at least one substance selected from the group consisting of $Al_2O_3$, MgO, Al and O.

According to the invention that has been described above, it is possible to obtain a bonded material in which the bonded interface has a strength higher than the flexural strength of alumina ceramics and is excellent in corrosion resistance to molten Na attack. Thus, parts used for chemical industry fields where molten sodium is handled or parts for sodium-sulfur batteries can be obtained in simple manners.

We claim:

1. A multi-layer metal-ceramic material, comprising:

an alumina layer;

a metallic layer comprising three sub-layers including an aluminum core layer and first and second opposed surface layers, at least said first opposed surface layer comprising an Al—Si—Mg matrix alloy, wherein said alumina layer and said metallic layer are stacked together to form a bonding interface between said first opposed surface layer and said alumina layer; and a reaction layer present along said bonding interface between said alumina layer and said first opposed surface layer of said metallic layer, said reaction layer being formed by pressing said alumina layer and said metallic layer together and heating said alumina and metallic layers at a temperature not greater than the solidus of said Al—Si—Mg alloy, wherein said reaction layer consists essentially of $MgAl_2O_4$ spinel and MgO, or said reaction layer consists essentially of $MgAl_2O_4$ spinel, MgO and at least one material from the group consisting of $Al_2O_3$, Al and O.

2. The material of claim 1, wherein said aluminum core layer consists of aluminum.

3. The material of claim 1, further comprising a metal element bonded to said metallic layer.

* * * * *